United States Patent
Bicknell et al.

(10) Patent No.: US 8,712,198 B2
(45) Date of Patent: Apr. 29, 2014

(54) OPTICAL SPLITTER DEVICE

(75) Inventors: Robert Newton Bicknell, Corvallis, OR (US); Jong-Souk Yeo, Corvallis, OR (US); Lenward T. Seals, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 509 days.

(21) Appl. No.: 12/991,651

(22) PCT Filed: May 9, 2008

(86) PCT No.: PCT/US2008/063325
§ 371 (c)(1),
(2), (4) Date: Nov. 8, 2010

(87) PCT Pub. No.: WO2009/136948
PCT Pub. Date: Nov. 12, 2009

(65) Prior Publication Data
US 2011/0123152 A1    May 26, 2011

(51) Int. Cl.
*G02B 6/34*    (2006.01)
*G02B 6/28*    (2006.01)

(52) U.S. Cl.
USPC .............................................. 385/36; 385/24

(58) Field of Classification Search
USPC ........................................................ 385/36
See application file for complete search history.

(56) References Cited

U.S. PATENT DOCUMENTS

| | | | | |
|---|---|---|---|---|
| 247,229 | A | | 9/1881 | Wheeler |
| 2,815,695 | A | * | 12/1957 | Scharf et al. ................... 359/583 |
| 3,575,602 | A | * | 4/1971 | Townes et al. .................. 398/91 |
| 3,704,934 | A | * | 12/1972 | Holmes et al. ........... 359/489.08 |
| 4,500,167 | A | * | 2/1985 | Mori ................................ 385/31 |
| 4,688,892 | A | | 8/1987 | Laakmann |
| 4,688,893 | A | | 8/1987 | Laakmann |
| 5,379,354 | A | | 1/1995 | Jenkins |
| 5,396,570 | A | | 3/1995 | Jenkins et al. |
| 5,438,640 | A | | 8/1995 | Sasaoka et al. |
| 5,500,523 | A | * | 3/1996 | Hamanaka ..................... 250/216 |
| 5,562,838 | A | | 10/1996 | Wojnarowski et al. |
| 5,625,738 | A | * | 4/1997 | Magarill ....................... 385/146 |
| 5,716,442 | A | * | 2/1998 | Fertig ............................ 136/246 |
| 5,737,458 | A | | 4/1998 | Wojnarowski et al. |

(Continued)

FOREIGN PATENT DOCUMENTS

CN    2530263          1/2003
EP    803757 A1 * 10/1997

(Continued)

OTHER PUBLICATIONS

Translation of Eiki Yamada, JP 53-155310, Dec. 6, 1978.*

(Continued)

*Primary Examiner* — Michelle R Connelly (57) ABSTRACT

An optical splitter device and method are provided. The device can include a waveguide having walls forming a large hollow core. The waveguide can be configured to direct an optical signal through the large hollow core. An optical tap can be formed through at least one wall of the waveguide. In addition, a prism can be located in the large hollow core of the waveguide and aligned with the optical tap. A splitter coating can be provided on the prism to direct a portion of the optical signal outside of the waveguide through the optical tap.

17 Claims, 11 Drawing Sheets

(56) References Cited

U.S. PATENT DOCUMENTS

| | | |
|---|---|---|
| 5,917,596 A | 6/1999 | Jenkins |
| 5,982,541 A * | 11/1999 | Li et al. .......................... 359/242 |
| 5,982,970 A | 11/1999 | Schneider |
| 6,785,447 B2 | 8/2004 | Yoshimura et al. |
| 7,006,735 B2 | 2/2006 | Janssen |
| 7,006,736 B2 | 2/2006 | Lee et al. |
| 7,452,086 B2 * | 11/2008 | Li ..................................... 353/98 |
| 7,775,669 B2 * | 8/2010 | Liao et al. ......................... 353/94 |
| 2002/0164120 A1 | 11/2002 | Perner |
| 2002/0172459 A1 | 11/2002 | Bailey et al. |
| 2003/0205065 A1 | 11/2003 | Matsuura et al. |
| 2003/0223237 A1 | 12/2003 | Janssen |
| 2004/0031910 A1 | 2/2004 | Mechler |
| 2005/0089262 A1 | 4/2005 | Jenkins et al. |
| 2006/0171626 A1 | 8/2006 | McNie et al. |
| 2007/0211339 A1 * | 9/2007 | Furusato ....................... 359/495 |

FOREIGN PATENT DOCUMENTS

| | | |
|---|---|---|
| EP | 0803757 A1 | 10/1997 |
| GB | 2112166 | 7/1983 |
| JP | 53-155310 | 12/1978 |
| JP | 1978-155310 U | 12/1978 |
| JP | 56011405 A * | 2/1981 |
| JP | 1983-083802 | 5/1983 |
| JP | 58083802 A * | 5/1983 |
| JP | S60-201306 | 10/1985 |
| JP | 06-174954 | 6/1994 |
| JP | 11-258434 | 9/1999 |
| JP | 2003-121795 | 4/2003 |
| JP | 2004-040796 | 2/2004 |
| JP | 2005-516253 | 6/2005 |
| KR | 10-20040105268 | 12/2004 |
| WO | WO-03-065091 | 8/2003 |
| WO | WO-03/065091 | 8/2003 |

OTHER PUBLICATIONS

Hewlett-Packard Dev. Co., L.P., PCT/US08/63325, PCT International Search Report, dated Feb. 9, 2009.

Marcatili, et al., "Hollow Metallic and Dielectric Waveguides for Long Distance Optical Transmission and Lasers", The Bell System Technical Journal, Jul. 1964, pp. 1783-1809.

Mohebbi, et al., "Silver-coated hollow-glass waveguide for applications at 800 nm" Applied Optics, Nov. 20, 2002, vol. 41, No. 33, pp. 7031-7035.

European Search Report (Supplementary), Jul. 23, 2012, Hewlett-Packard Development Company, et al., EP Application No. 08780642.8.

Search Report, Jun. 5, 2013. European Patent Office, Munich. Patent Application No. EP13157449.3.

Examination Report, May 2, 2013. European Patent Office, Munich. Patent Application No. EP08780642.8.

\* cited by examiner

OPTICAL SPLITTER DEVICE

BACKGROUND

As computer chip speeds on circuit boards increase to ever faster speeds, communication bottlenecks in inter-chip communication are becoming a more significant problem. One possible solution to try to avoid bottlenecks is to use fiber optics to interconnect high speed computer chips. However, most circuit boards involve many layers and often require tolerances in their manufacture of less than a micron. Physically placing fiber optics and connecting the fibers to the chips can be too inaccurate and time consuming to be widely adopted in circuit board manufacturing processes.

Routing the optical signals around and between circuit boards can add significant additional complexity. Marketable optical interconnects between chips have therefore proven illusive, despite the need for broadband data transfer.

DETAILED DESCRIPTION

One method for forming optical interconnects between computer chips on a circuit board is to use optical waveguides formed on the circuit board. Optical waveguides can be superior to fiber optic communications for interconnecting electronics because of the ability to form the waveguides on the circuit board using lithographic, mechanical, or similar processes. The waveguides are typically formed on the circuit boards with substantially optically transparent material, such as polymers and/or dielectrics. Optical waveguides made using lithographic or similar processes can also be formed on other types of substrates that are not mounted on a circuit board, such as a silicon wafer with a microchip. As an additional example, optical waveguide(s) may be formed on a flexible substrate to create a ribbon cable having one or more optical waveguides. The optical waveguides disclosed herein are formed on substrates using lithographic or similar processes.

Forming optical waveguides in this fashion can provide interconnects that are constructed with the necessary physical tolerances to be used on modern multi-layer circuit boards. However, the polymers, dielectrics, and other materials that can be used in chip and circuit board manufacture to form the on-board waveguides are typically significantly more lossy than fiber optics. Indeed, the amount of loss in on-board waveguides has been one of the factors limiting the acceptance of optical waveguide interconnects. Polymers used to construct the waveguides can have a loss of 0.1 dB per centimeter. In contrast, the loss in a fiber optic is around 0.1 dB per kilometer. Thus, polymer waveguides can have losses that are orders of magnitude greater than the loss in fiber optics.

In addition, typical waveguides are usually manufactured to have dimensions that are roughly proportional to the wavelength of light they are designed to carry. For example, a single mode waveguide configured to carry 1000 nm light may have its largest dimension of 1000 nm to 5000 nm (1 μm to 5 μm). Connecting waveguides of this size can be expensive and challenging. The cost of creating and connecting waveguides has historically reduced their use in most common applications. Multimode waveguides may have larger dimensions on the order of 20-60 μm for the core region. Both single and multimode waveguides have a relatively high numerical aperture (NA). The numerical aperture determines the divergence of beam from the emitting fiber. Thus, a larger NA will result in poor coupling as a function of fiber to fiber separation. Splitting and tapping of the guided optical beams is also difficult to accomplish using these types of waveguides.

Figure 1:
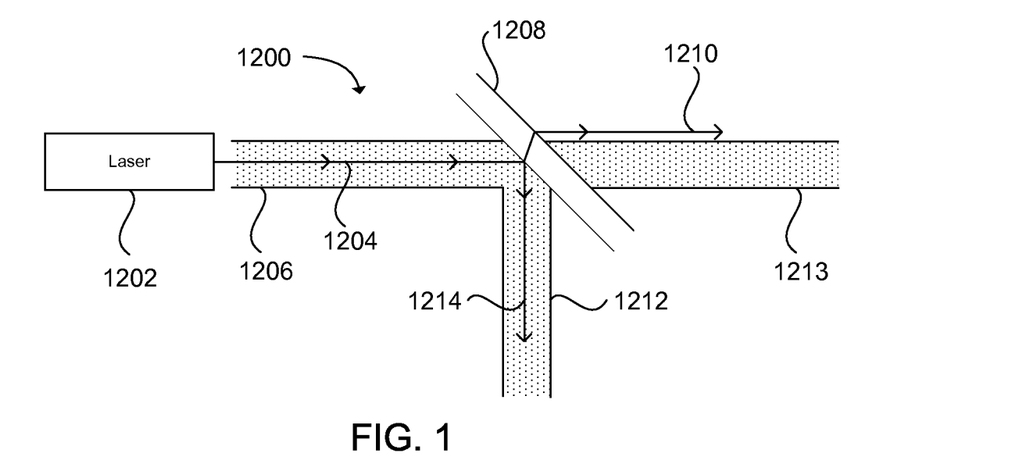
FIG. 1 is a cross-sectional illustration of a large core hollow waveguide coupled to a single mode laser and a beam splitter.

A substantial improvement over previous optical waveguides formed using polymers or dielectric materials is the use of a large core hollow waveguide 1200 configured to guide coherent optical beam 1204, as shown in FIG. 1. The large core hollow waveguide can have a diameter (or width and/or height) on the order of 50 to 150 or more times a wavelength of the coherent optical beam the waveguide is configured to guide. The large core hollow waveguide can have a cross-sectional shape that is square, rectangular, round, elliptical, or some other shape configured to guide an optical signal. Furthermore, because the waveguide is hollow, the optical beam essentially travels at the speed of light in air or a vacuum.

FIG. 1 illustrates a laser 1202 emitting a single mode beam 1204 into a waveguide 1206. A splitter 1208 is used to redirect a portion of the optical beam, referred to as the reflected beam 1214 into an orthogonal waveguide 1212. The remaining optical beam, referred to as the transmitted beam 1210, can continue in the same direction as the original beam 1204.

Figure 2:
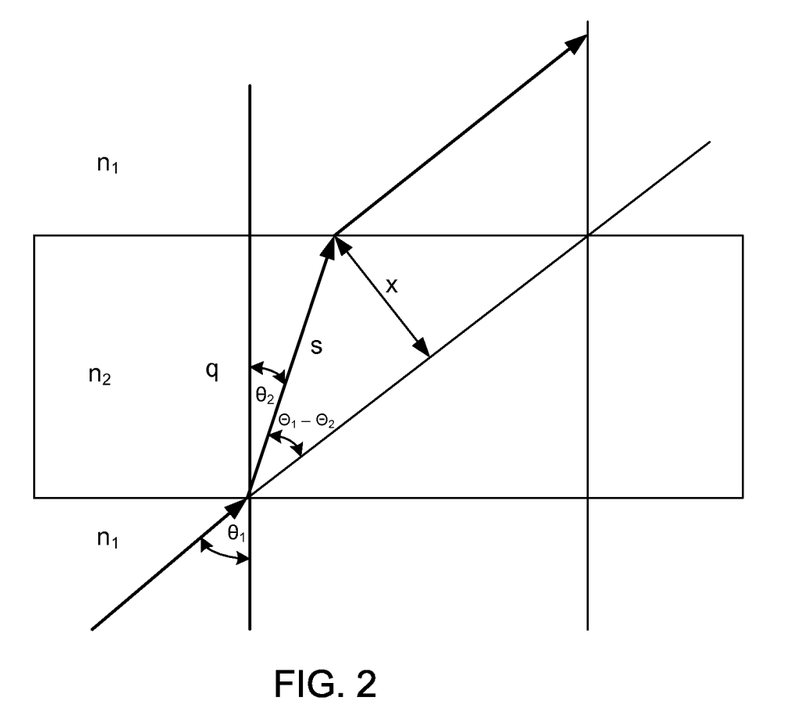
FIG. 2 is an illustration of beam walk-off that occurs within a beam splitter.

It can be seen in the illustration in FIG. 2 that a significant amount of beam walk-off can occur within the beam splitter 1208. Beam walk-off is the phenomenon which occurs due to a change in an index of refraction between the hollow waveguide (with the refractive index of air or a vacuum) and the beam splitter. For example, a beam splitter formed of silicon dioxide has an index of refraction of 1.45. A beam splitter formed of $Si_3N_4$ has an index of refraction of 2.20.

The beam is refracted as it enters the beam splitter. The angle at which the refraction occurs depends on the difference in the index of refraction between the waveguide and the beam splitter. Beam walk-off is the distance that the beam travels due to the refraction. The distance is typically proportional to the thickness of the optical device, in this case the beam splitter. Beam walk-off can result in a displacement of the mode within the hollow metal waveguide resulting in loss due to excitation of higher order modes near the edges of the waveguide. Lateral displacement can even result in the transmitted beam 1210 being directed outside the section 1213 of the hollow metal waveguide that occurs after the beam splitter.

An expanded view of the optical tap is shown schematically in FIG. 2. The angle of incidence is denoted as $\theta_1$ in air and $\theta_2$ in the tap media. The optical tap thickness is shown as d, the length of the ray in the tap as s, and the walk-off distance as x. Based on the geometry of the beam entering the tap media, $$\cos(\theta_2) = \frac{d}{s} \quad (1)$$

$$\sin(\theta_1 - \theta_2) = \frac{x}{s}. \quad (2)$$

Substituting equation 1 into 2, one obtains:

$$\sin(\theta_1 - \theta_2) = \frac{x}{\frac{d}{\cos(\theta_2)}}. \quad (3)$$

Solving for the walk-off distance, x:

$$x = \frac{d\sin(\theta_1 - \theta_2)}{\cos(\theta_2)}. \quad (4)$$

Using equation (4) and along with Snell's law:

$$n_1 \sin(\theta_1) = n_2 \sin(\theta_2) \quad (5)$$

One can obtain a relationship between the incident angle of the beam, the indices of refraction of the medium relative to the tap, the thickness of the tap, and the walk-off distance caused by the tap.

Beam walk-off can appear exaggerated when using comparatively small waveguides. For example, even when a relatively thin beam splitter 1208 having a thickness of approximately 250 µm (¼ millimeter) is used in a 50 µm waveguide, the beam walk-off of a transmitted beam traveling through the beam splitter can be a lateral shift on the order of 75 µm, 1.5 times the thickness of the waveguide. To compensate for the lateral shift of the beam walk-off, the waveguide can be shifted, as illustrated in FIG. 3.

Shifting the position of the waveguides at each junction to compensate for beam walk-off can complicate manufacturing. One alternative to minimize beam walk off is to minimize the thickness of the beam splitters. This is more fully disclosed in the co-pending U.S. patent application Ser. No. 11/832,559 filed on Aug. 1, 2007. However, the use of extremely thin beam splitters can provide different manufacturing complications. In some embodiments, the use of shifted hollow metal waveguides can be economical relative to other methods, such as the use of thin beam splitters.

Significant losses can occur within a waveguide if the optical pathway through the waveguide is not substantially straight. Bends or turns that occur in the waveguide can cause the optical beam to have an unwanted number of bounces, causing a substantial amount of attenuation. To enable optical signals to be routed in a different direction, mirrors, splitters, and lenses can be used.

Figure 3:
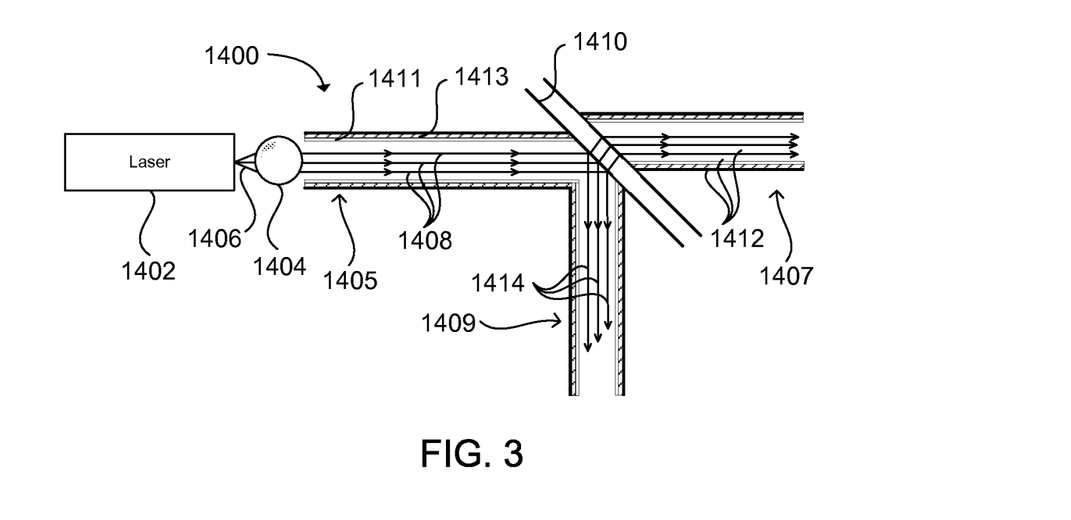
FIG. 3 is a side view illustration of a multi-mode laser with a collimating lens coupled to a large core hollow waveguide having a reflective interior and a coupling device to an offset large core hollow waveguide.

In order to decrease loss within a hollow core waveguide, a reflective coating 1413 may be added to cover an interior of the waveguide 1400, as shown in FIG. 3. The reflective coating can be formed using plating, sputtering, or similar processes, as can be appreciated. If the hollow waveguide comprises a polymer or other material with a low melting point, the reflective coating may be applied using a low temperature process such as sputtering, electroplating or thermal evaporation.

The reflective coating 1413 can be comprised of one or more layers of metal, dielectrics, or other materials that are substantially reflective at the wavelength of the coherent optical beam. The metals can be selected based on their reflectivity. A highly reflective layer covering the channel is desired. For example, the reflective layer may be formed using silver, gold, aluminum, or some other metal or alloy that can form the highly reflective layer. Alternatively, the reflective layer may be a dielectric stack which can be formed from one or more layers of dielectric material that are substantially reflective at a selected wavelength. Before the reflective layer is deposited, the uncoated hollow channel may be subject to a heat reflow to smooth out any surface roughness. The reflective layer may also undergo a heat reflow or similar process to smooth surface roughness in the reflective layer that may occur during the deposition process. Electro-polishing may also be used to smooth out the reflective metal surface.

If the photonic guiding device is not hermetically sealed, the reflective coating 1413 may oxidize over time. Oxidation of the reflective coating can substantially reduce its reflectivity. To reduce or eliminate degradation of the metal coating's reflectivity, a protective layer 1411 can be formed over the reflective coating to act as a protective cover. The protective layer can comprise a material that is substantially transparent at the wavelength of the coherent optical beam. For example, the protective layer can be formed of silicon dioxide or some other material that can form a substantially air tight bond over the reflective coating. This protective layer will also reduce the propagation loss by further separating the propagating optical beam from the lossy reflective layer.

Hollow waveguides with reflective surfaces operate differently than solid waveguides. Hollow waveguides work using the principle of attenuated total internal reflection guiding light through reflection from the reflective layer(s) and not through total internal reflection between a higher index core region and a lower index cladding region, as typically occurs in solid waveguides such as an optical fiber. The optical beam within the hollow waveguide may be reflected at angles greater than what is necessary for total internal reflection, as can be appreciated.

Ideally, a single mode laser is typically used to direct coherent light into a hollow waveguide. However, single mode lasers can be relatively expensive. It has been discovered that a less expensive, multi-mode laser such as a vertical-cavity surface-emitting laser (VCSEL) can be useful in communicating high data rate signals through relatively short distances using hollow waveguides having reflective inner surfaces. For example, multi-mode lasers can be used to direct high data rate signals through large core hollow reflective waveguides for inter-chip and inter-circuit board connections. The use of multi-mode lasers can significantly decrease the cost of optical interconnects, enabling the interconnection of a much wider variety of electronic devices. However, multi-mode laser output can have significantly greater losses when directly coupled to a hollow metal waveguide due to multiple reflections of higher modes which propagate at large angles.

To overcome the attenuation of the higher modes emitted from a multi-mode laser 1402, a collimator 1404 can be placed within a path of the multi-mode coherent light rays 1406 emitted from the laser. The collimator can be a collimating lens or series of lenses. In one embodiment, the collimator can be configured as a ball lens. The ball lens can have an anti-reflective coating.

The collimator 1404 is configured to collimate the multi-mode beam to cause a plurality of the multiple modes, or rays 1406 emitted from the laser 1402 to form a collimated beam 1408 in which the multiple modes travel substantially in parallel within the large core hollow waveguide 1400. Collimation of the multi-mode beam can be used to efficiently couple the multimode laser to the low loss mode of the hollow metal waveguide by launching rays which are nearly parallel to the waveguide, substantially reducing the number of reflections that occur within the waveguide. Reflections of the collimated beam that do occur within the waveguide will typically be at a relatively shallow angle with respect to the waveguide walls, thus minimizing the number of reflections within the waveguide and therefore reducing the attenuation of the optical beam within the hollow waveguide.

FIG. 3 illustrates a system in which a multi-mode laser 1402 emits a multi-mode coherent optical beam 1406. The multi-mode coherent optical beam comprises a plurality of rays at increasing angles. The rays are sent through a collimator 1404, as previously discussed, to enable the rays to be substantially parallel within the large core hollow waveguide 1400. The collimator may be a single lens. Alternatively, the collimator may be comprised of a plurality of lenses configured to enable the rays in the multi-mode coherent beam to be substantially parallel.

A reflected portion 1414 of the substantially collimated multi-mode coherent optical beam may be redirected from a first large core hollow waveguide 1405 to a second large core hollow waveguide 1409 using a coupling device 1410 that is optically coupled to the first and second waveguides. The coupling device can be configured to redirect at least a portion of the optical beam from the first to the second waveguide, while enabling the rest of the energy to remain in the first waveguide. In accordance with one aspect of the invention, the width and refractive index of the coupling device can be selected to provide a desired amount of beam walk-off.

While FIGS. 1 and 3 have provided exemplary illustrations directing collimated laser beams through the large core hollow waveguides, the use of large core hollow waveguides are not limited in use to only collimated beams or coherent optical beam from a laser source. For example, non-collimated laser light can be introduced into the large core hollow waveguides. Higher order modes will be naturally filtered within the waveguides due to the greater number of reflections that the higher modes undergo. Thus, even a non-collimated optical beam that is input into a first waveguide 1405 can emerge from the first waveguide as substantially a collimated optical beam that can be divided into a transmitted beam 1412 and reflected beam 1414. The large core hollow waveguides may also be used with substantially coherent light emitted from a light emitting diode, or another source of substantially coherent light.

As previously discussed, the beam walk-off is the offset amount of the beam within the waveguide caused by refraction of the optical beam within the coupling device. A third large core hollow waveguide 1407 can be shifted to receive the offset transmitted portion 1412 of the multimode coherent optical beam after it has been shifted within the coupling device 1410. However, manufacturing shifted or offset waveguides, as illustrated in FIG. 3, can complicate the overall manufacturing process and increase the overall product costs.

Figure 4:
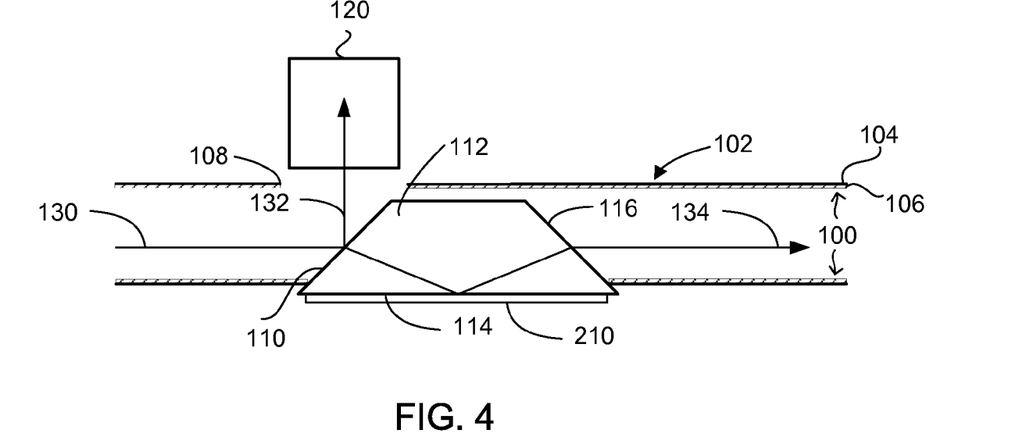
FIG. 4 is an illustration of a side view of a dove prism used as an optical splitter in a waveguide in accordance with an embodiment.

FIG. 4 illustrates an embodiment of an optical splitter device that can split optical beams without the need for offset waveguides or more expensive pellicle beam splitters. The illustrated optical splitter device uses prisms to correct for beam walk-off. The optical splitter uses a waveguide 102 that has walls 104 which form a large hollow core 100. The waveguide is configured to direct an optical signal through the large hollow core. The walls of the waveguide can be metalized 106 or otherwise provided with an internal reflective coating in order to reflect and guide the optical signals, as described previously.

The optical signals 130 or beams used by the system can originate from either a single mode or multi-mode laser. The lasers may use infrared light, visible light or other useful optical spectrums. Single mode lasers are typically used in conjunction with hollow waveguides to minimize reflections. However, it has been discovered that a multi-mode laser may be combined with a collimator to provide a multi-mode coherent light source having collimated rays. Use of the coherent multi-mode laser can significantly reduce production costs. In addition, the use of a coherent multi-mode optical source can enable high data rate signals to be communicated using the waveguide. Other forms of substantially coherent light can also be used, such as light emitting diodes or infrared emitting diodes.

The collimated multi-mode coherent optical beam can fill a significant portion of the large core hollow waveguide. The beam can be directed about the center of the waveguide to minimize contact between the waveguide and the multi-mode beam and to reduce the number of reflections.

An optical tap 108 can be formed through at least one wall of the waveguide 102. The optical tap can be cut through the top of the waveguide so that a portion of the optical signal can be split off from the main optical signal and be routed through the optical tap. An optical sensor 120 can also be provided for detecting an optical signal that is reflected through the optical tap.

A prism 112 can be located in the large hollow core 100 of the waveguide 102 and the prism can be aligned with the optical tap 104. The prism is configured to redirect optical signals passing through the prism back into the waveguide by using the walk-off created by reflecting the transmitted beam off an internal face of the prism. The transmitted optical signals 134 or beams can be redirected into the waveguide with the same orientation at which they entered the prism or at another orientation (e.g., different angle and/or polarization) as defined by the prism and the coatings used on the prism.

FIG. 4 illustrates that a dove prism 112 may be the type of prism that is used to re-direct beams back into the same channel (non-offset channel), but other prism shapes and polygonal prisms can be used. The prism can be made of an optical material that is transparent to the wave lengths of interest. Some example ranges for optical wavelengths of interest can be between 1350 nm-1500 nm or between 850 nm and 980 nm. Examples of prism materials can be optical silicon glass, optical plastic, quartz or another type of crystal useful for optical purposes.

The prism can include a splitter coating 110 on the prism to reflect a portion of the optical signal 132 outside of the waveguide through the optical tap 108. The splitter coating can be dielectric coating such as silicon dioxide, tantalum dioxide, titanium dioxide, a multi-layer dielectric, a thin metallic coating, or any other known splitter coating. The coatings on the prism are preferably polarization insensitive for polarization independent beam splitter applications. The type and thicknesses of the splitter coatings used depend on the desired splitting ratios and polarization properties of the coatings.

In addition to the splitter coating on a receiving face 110, the dove prism can have an anti-reflective coating 116 on an outgoing face. This anti-reflective coating allows the transmitted beams to pass out of the prism efficiently. The dove prism may also be configured to have total internal reflection on a base 114 of the dove prism. The total internal reflection can be created by forming or leaving an air gap 210 between the silicon substrate and the prism. The total internal reflection can occur where a beam travels from a medium with a higher refractive index to one with a lower refractive index, as in the present situation. Alternatively, the base of the dove prism may be metalized to provide the desired reflection. The incoming optical signals or beams that are not split off will be transmitted into the prism and reflected off the base 114 of the dove prism. Then the transmitted beam 134 will pass through the prism and re-enter the waveguide without the walk-off after passing through the prism, because the walk-off is compensated by the symmetric refractions at the air to prism medium and the medium to air interfaces.

As mentioned, being able to redirect the transmitted beam back into the waveguide is valuable because it reduces the complexity of waveguide paths that might otherwise be necessary to account for walk-off Providing a beam splitter that returns the beam into an un-shifted waveguide can simplify the waveguide path. In particular, avoiding the creation of offset waveguides or similar adjustments makes the overall waveguide system easier to produce and may reduce total attenuation.

Figure 5:
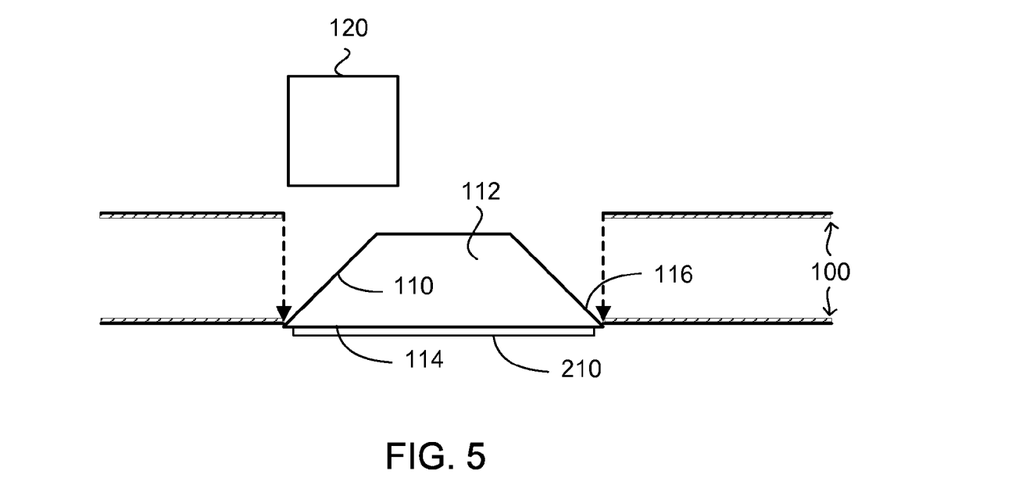
FIG. 5 is an illustration of a side view of a dove prism optical splitter inserted into a waveguide in accordance with an embodiment.

FIG. 5 is an example of a method of manufacturing the device, where a dove prism is inserted into a waveguide. Initially, a large core, hollow waveguide channel is formed. An opening can then be created in the side wall of the waveguide. The opening may be formed using a sawing method, laser ablation, etching, or a photo-lithographic process. Next, the dove prism 112 can be inserted into the waveguide channel and affixed into place. Then, the waveguide cover with a slot opening can be applied to the waveguide channel to enable the reflected optical signal to be routed out to an optical sensor or detector 120.

In the displayed embodiment of FIGS. 4 and 5, the optical sensor 120 has been shown as being substantially displaced from the waveguide. However, the optical sensor may be located directly adjacent to the waveguide.

Figure 6:
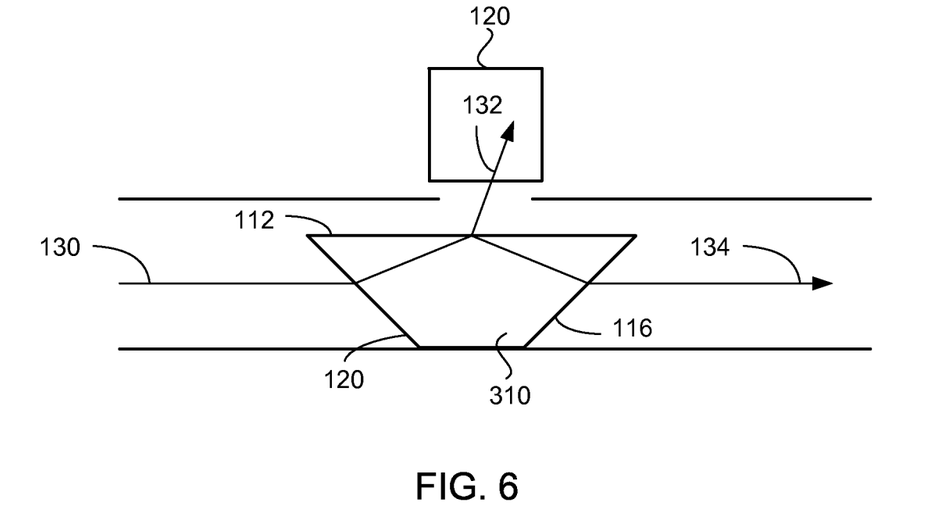
FIG. 6 is an illustration of a side view of an inverted dove prism used as an optical splitter in a waveguide in accordance with an embodiment.

FIG. 6 illustrates the use of an inverted dove prism 310 in a waveguide. The inverted dove prism can operate using walk-off but different faces of the dove prism may be used for splitting the optical signals. The inverted dove prism can have a splitter coating 112 on an inverted base of the inverted dove prism. An anti-reflective coating can be placed on both an incoming face 110 and outgoing face 116 of the inverted dove prism. This configuration allows an incoming optical signal or light beam to be split into a reflected beam 132 that reaches a sensor 120 and a transmitted beam 134 that is returned into the waveguide.

Figure 7:
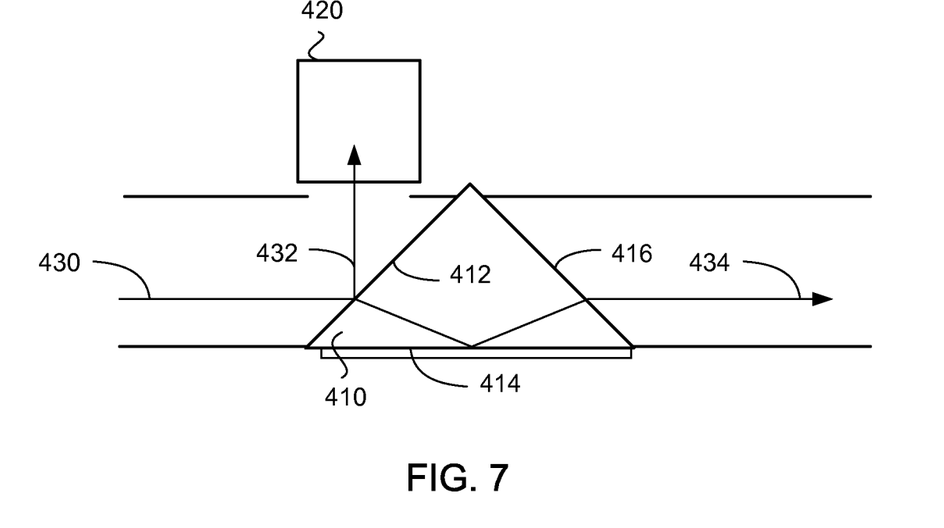
FIG. 7 is an illustration of a side view of an right angle prism used as an optical splitter in a waveguide in accordance with an embodiment.

Other types of prisms can also be used to achieve a similar result that corrects for beam walk-off, as illustrated in FIG. 7. For example, the prism located in the waveguide can be a triangular prism. More specifically, the triangular prism may be a right angle prism 410. The right angle prism can have a splitter coating 412 on an incoming face and an anti-reflective coating on an outgoing face 416. The incoming optical signal or light beam will be split into a reflected beam 432 that reaches a sensor 420 and a transmitted or recovered beam 434 that is returned into the waveguide.

The hypotenuse 414 of the right angle prism can use total internal reflection to redirect the beam that has been refracted back into the waveguide by the walk-off. After the beam direction has been changed by the first amount of walk-off, the beam will bounce off of the hypotenuse at the incident angle and then a second amount of walk-off will redirect the transmitted beam back into the same waveguide channel. The reflected beam may be sent back into the waveguide at the same angle at which it entered the prism. Alternatively, the ray may pass out of the prism at a different angle than it originally entered the prism depending on the actual geometry of the prism and the prism coatings.

Figure 8:
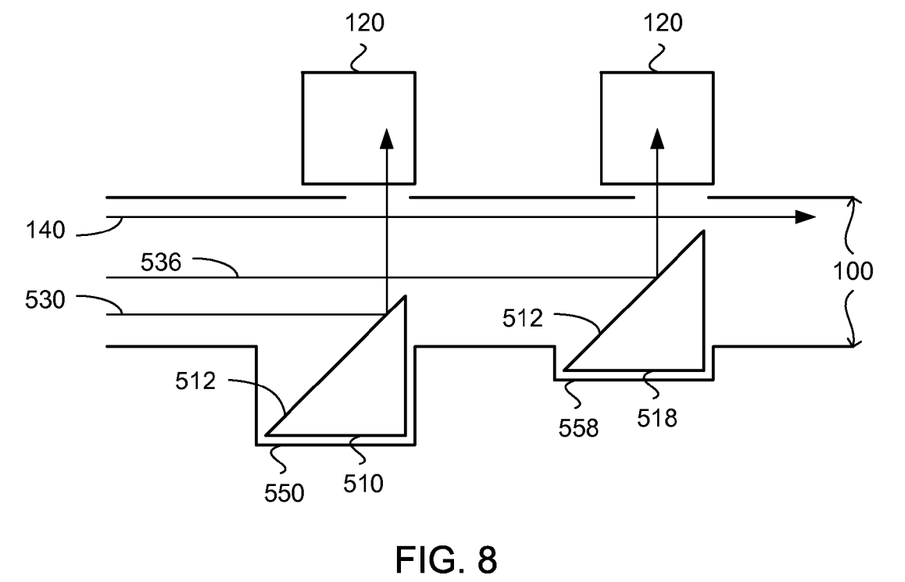
FIG. 8 is an illustration of a side view of right angle prisms used as an area based optical splitter in a waveguide in accordance with an embodiment.

FIG. 8 illustrates the use of triangular prisms or right angle prisms as area based beam splitters. Since the guided beam fills up the waveguide while propagating, portions of the beam can be reflected if a certain area of the waveguide is formed as reflected surfaces at a 45 degree angle for a 90 degree split of optical signal. The split ratio is approximately dependent on the ratio of the propagating and reflective areas within the waveguide depending on the mode profile of propagating beam.

In order to construct a waveguide structure with multiple split ports at varying split ratios, multiple triangular prisms 510, 518 can have a metalized reflection layer applied to the hypotenuse 512 of the prism. These prisms can be inserted into a waveguide 100 at increasing heights. The prisms can be inserted into the waveguide using a number of cross slots that may be sawed or machined into the waveguide and silicon substrate in order to form steps 550, 558 on which the prisms are positioned. The prisms may also be affixed to the silicon substrate as they are inserted onto the steps or the prisms of varying heights or sizes may be formed directly on the substrate.

An area prism is inserted into the waveguide far enough to reflect the desired portion of the optical beams to a detector 120. For example, a first area prism can reflect the lowest portion of the optical beams 530. Then the second area prism can reflect the next higher portion of the optical beams 536 when the prisms are sufficiently close together. There may also be additional prism splitters or reflectors that are not shown in the drawing that would reflect the remaining portions of the optical beam 540 until the entire optical beam has been reflected out of the waveguide. The area of the prism that covers a portion of a waveguide cross-section determines the approximate split ratio.

Where the first prism and second prism are sufficiently spread apart, the remaining portion of the beam that is not reflected by the area based splitter will completely fill up the waveguide channel while propagating so that the percentage of area occupied by the second prism determines the split ratio. The design presented may be particularly useful in an optical bus architecture where a series of beam splitters are incorporated into a waveguide for the routing of optical signals.

Figure 9:
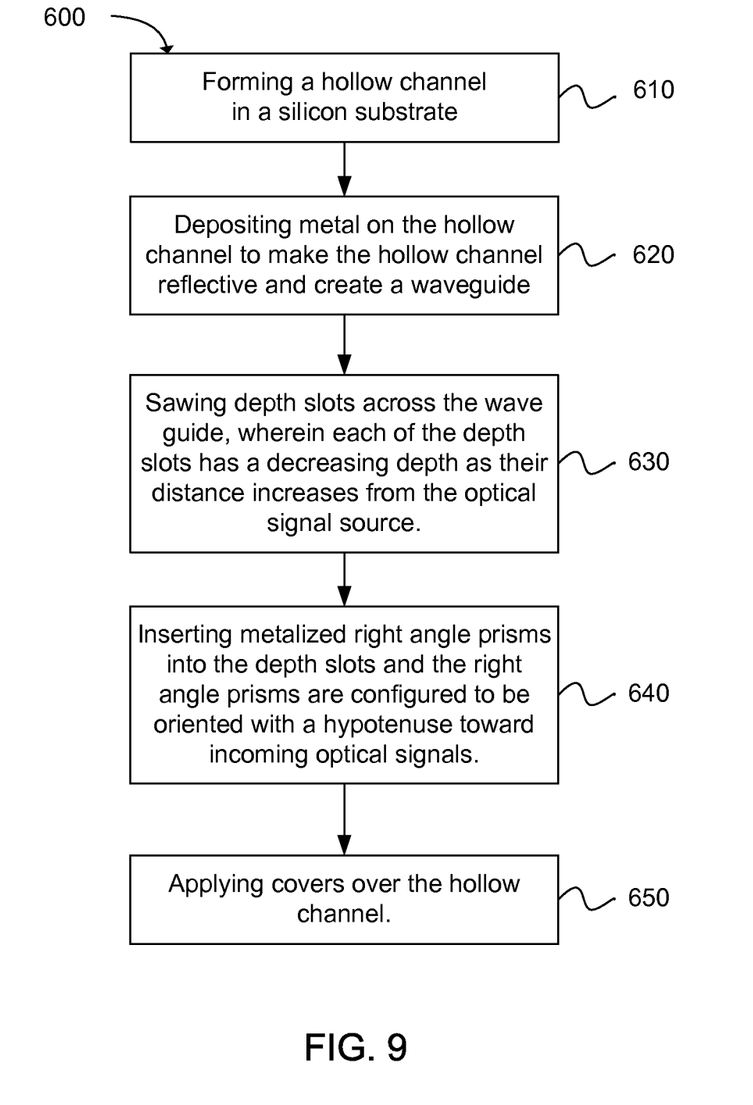
FIG. 9 is a flow chart illustrating a method for building an optical prism splitter in a waveguide in accordance with an embodiment.
Figure 10:
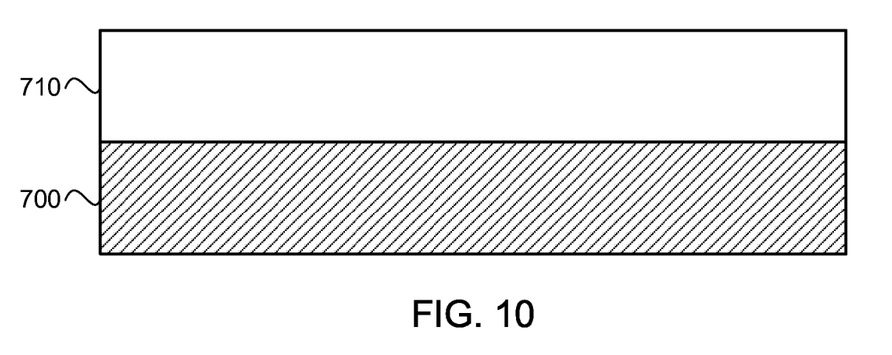
FIG. 10 is an illustration of a side view of a waveguide patterned and metalized on a silicon substrate in accordance with an embodiment.

An exemplary method for manufacturing an optical splitter device for a waveguide having a large hollow core will now be described and each operation will be described in relation to a cross-sectional manufacturing diagram in a separate figure. FIG. 9 is a flowchart that shows an initial operation of forming a hollow channel in a silicon substrate, as in block 610. FIG. 10 illustrates the creation of the waveguides 710 on top of a silicon substrate 720 such as a silicon wafer. The waveguides can be formed by sawing, embossing, laser patterning, photolithography, or other semiconductor manufacturing techniques. For example, a waveguide can be formed by patterning photoresist onto the silicon substrate and then removing the unwanted portions of the silicon substrate using an exposure process. The result of the processes can form a hollow channel with a bottom and side walls. For example, patterning the silicon substrate can further include the steps of applying photoresist, applying a photo-lithography process, applying a dry etching process, and using a cleaning process.

Alternatively, channels can be sawed into the silicon substrate with a saw process. For example, a dicing saw can be used to cut the channels for the waveguide. The dicing saw may employ a high-speed spindle fitted with a thin diamond blade or diamond wire to dice, cut, or groove semiconductor wafers, silicon, glass, ceramic, crystal, and many other types of material.

Once the waveguide channels have been created, then metal can be deposited into the hollow channel to make the hollow channel reflective, as in block 620 (FIG. 6). The deposition of metal can include applying an AlN (aluminum nitride) passivation layer and then applying reflective silver with titanium as a buffer layer to improve adhesion of metallic layer to the substrate. Other metals can also be used to create the reflective layer, as described previously. This reflective surface in a channel creates a waveguide channel.

Figure 11:
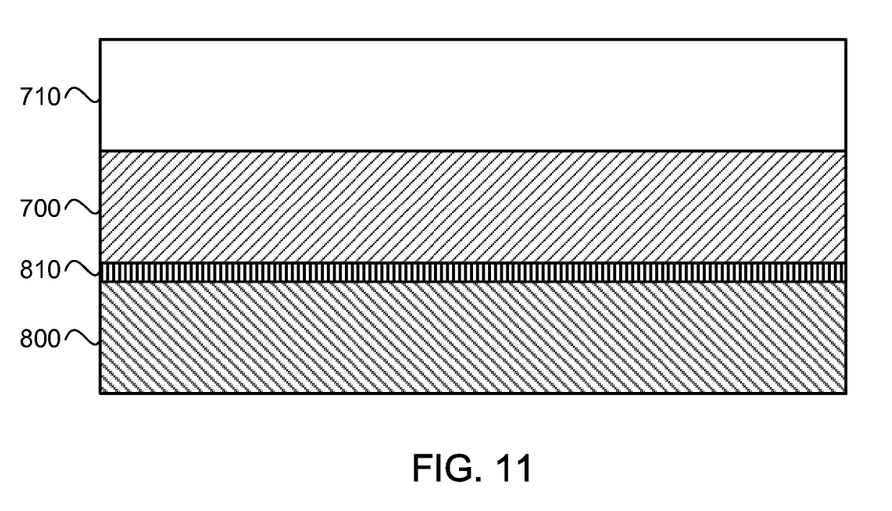
FIG. 11 is an illustration of a side view of a silicon substrate bonded to a support substrate using a bonding layer in accordance with an embodiment.

FIG. 11 illustrates an optional step in the method which can include bonding another silicon wafer 800 to the first silicon substrate or first silicon wafer. The second wafer can be bonded with a bonding layer 810. The reason the second wafer may be bonded to the first wafer is to increase the overall substrate depth in preparation for the next step of sawing. Additionally, adhesive between the two wafers tends to relieve the stress associated with the deep cutting and provides mechanical integrity. If a sufficiently thicker silicon substrate is used, then this operation may not be needed.

Figure 12:
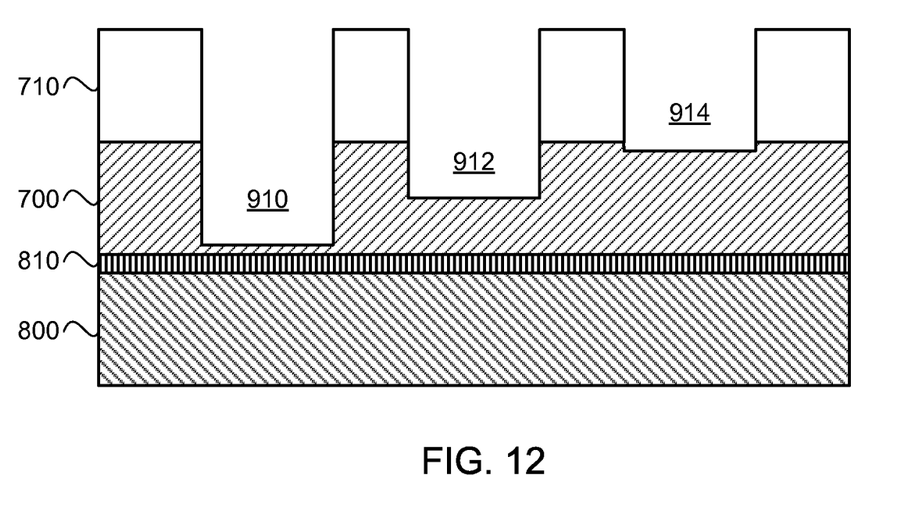
FIG. 12 is an illustration of a side view of slots cut into a waveguide and a substrate in accordance with an embodiment.

Another operation is sawing depth slots across the waveguide, as in block 630 (FIG. 9). FIG. 12 illustrates that each of the depth slots 910, 912, 914 can have a decreasing depth as the distance for the depth slots increases from an optical signal source. The depth slots can be sawed substantially orthogonally to the waveguide or sawed at other angles as selected for a specific optical application. The depth of the slot depends on the size of the prisms, the area ratio needed to achieve a desired split ratio for a given prism, and the mode profile of the guided beam within the waveguide channel.

Figure 13:
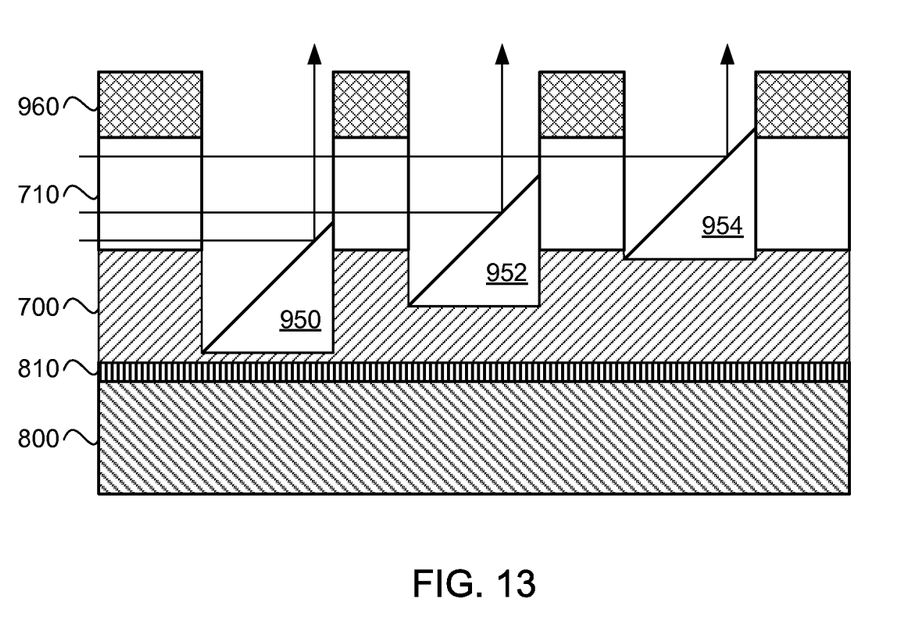
FIG. 13 is an illustration of a side view of prisms inserted into slots in a waveguide on a substrate and a cover attached over the waveguide in accordance with an embodiment.

Right angle prisms can then be inserted into the depth slots, as in block 640 (FIG. 9). As illustrated in FIG. 13, each prism 950, 952, 954 may have a metallic coating or other highly reflective coating on the prism's hypotenuse. Thus, the right angle prisms are configured to be oriented with a hypotenuse toward the incoming optical signals. These area based splitters can then reflect optical signals or beams out of the waveguide based on the area of the waveguide covered by each respective splitter. The configuration depicted in FIG. 13 is not necessarily a scale depiction but is merely illustrative of the area based splitting structures using a stepped support structure and prisms having a hypotenuse that reflects substantially all the light from a selected cross-section of the waveguide to a point outside of the waveguide (e.g., sensor).

A final operation is applying a cover over the hollow channel, as in block 650 (FIG. 9). The cover can also be applied before the sawing occurs, but the order of the operations described in this disclosure can be performed in any useful order. FIG. 13 further illustrates the waveguide covers 960. The waveguide covers include slots that allow the light to be directed from the right angle prisms to a point outside the waveguides. For example, the point outside the waveguide may have an optical sensor, micro lens arrays, or other waveguide channels. An alternative method to achieve varying split ratios is to use prisms of varying size with a constant depth slot. In this method, the slot to insert prism is cut at constant depth while the prism to be inserted is made at increasing height to provide desired split ratio.

Figure 14:
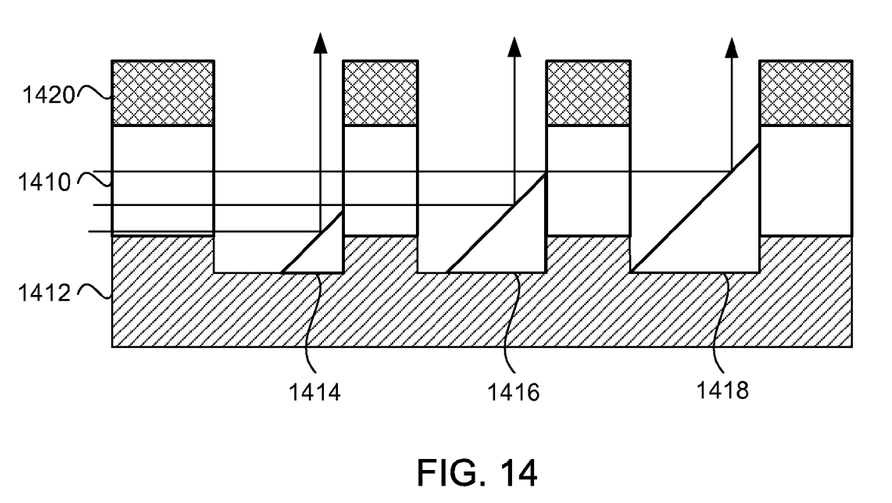
FIG. 14 is a cross-sectional illustration of prisms in an increasing order sizing and inserted into slots in a waveguide in accordance with an embodiment.

FIG. 14 is a cross-sectional illustration of a waveguide 1410 formed with substrate 1412 with a cover 1420. Prisms of increasing size 1414, 1416, 1418 are inserted into slots in accordance with an embodiment. In this type of area based prism splitting, the size of the prisms can be increased, instead of increasing the step height formed in the substrate as in other embodiments. Thus, uniform step heights can be used in the substrate and the prism sizes can be increased as the prisms are located farther from the optical beam source to vary the split ratio. Typically, these types of area splitters will be located relatively close together to avoid the expansion of the optical signals in the waveguide between each splitter.

Figure 15:
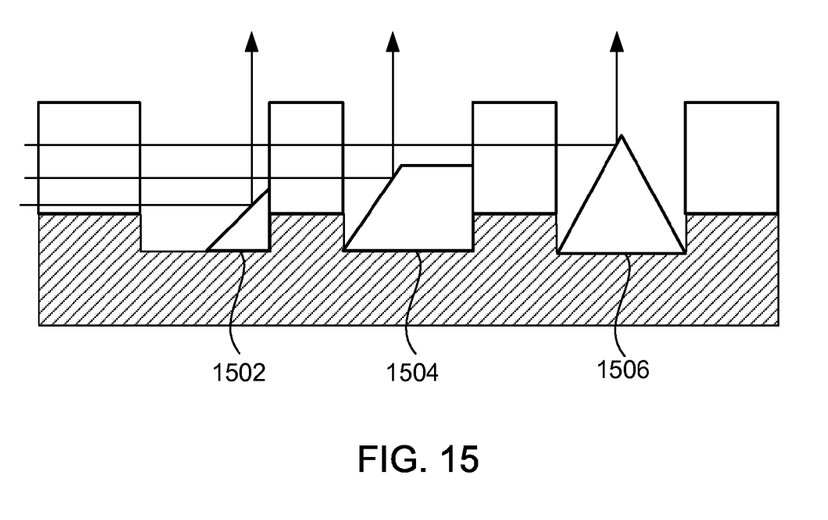
FIG. 15 is an illustration of using prisms of varying shapes inserted into slots in a waveguide in accordance with an embodiment.

FIG. 15 is a cross-sectional illustration of prisms of varying shapes inserted into slots in a waveguide in accordance with an embodiment. Many prism shapes can be used such as right triangle prisms 1502, dove prisms, equilateral triangles 1506, hexagons, octagons, and other polygons 1504 with the appropriate surfaces for reflecting beams at the desired angle out of a waveguide.

Figure 16:
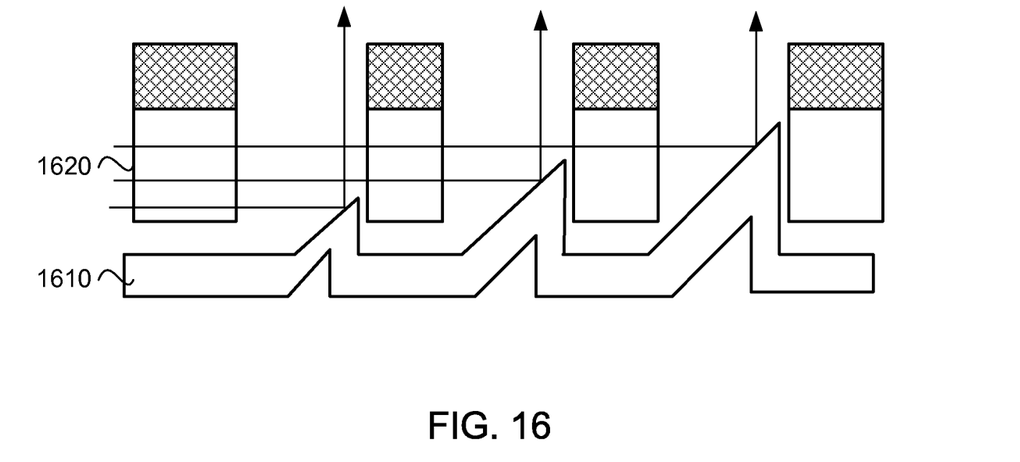
FIG. 16 is a cross-sectional view illustrating multiple sizes of splitter prisms that are injection molded or embossed into a waveguide wall in an embodiment.

FIG. 16 is a cross-sectional view showing the use of multiple sizes of prisms 1610 used for a waveguide 1620 which can be manufactured using injection molded plastic or similar materials onto a substrate. The surface of the prisms can be metalized as discussed earlier. Alternatively, such prisms can be embossed into or sawn from a waveguide wall in order to provide splitter prisms. The area based splitters described above can be fabricated directly onto or into a substrate in an integrated form using the injection molding, embossing, sawing, and similar manufacturing processes.

Figure 17:
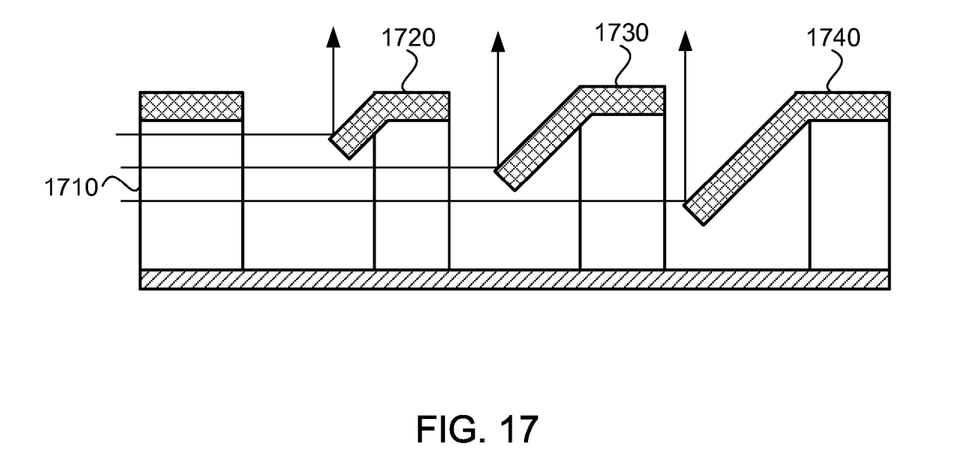
FIG. 17 illustrates an area based prism splitter where the prism splitter is formed with the cover of the waveguide as in an embodiment.

FIG. 17 illustrates an area based prism splitter where the splitter is formed with the cover or wall of the waveguide 1710. These reflective prism splitters 1710, 1720, 1730 can be formed into a wall of a wave guide using embossing, mechanical stamping or similar manufacturing methods.

Figure 18:
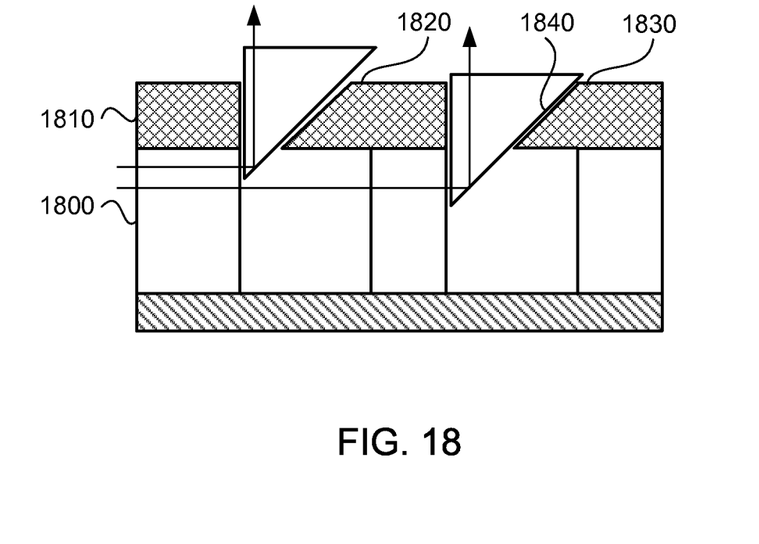
FIG. 18 illustrates a cross-sectional view of an area based splitter where the prisms are mounted in an optical tap in an embodiment.

FIG. 18 illustrates a cross-sectional view of area based splitters in a waveguide 1800 where the prisms are mounted through an optical tap. The waveguide cover 1810 can have prism mounts 1820, 1830 that provide support for the triangular or polygonal prisms that are installed into the optical tap and rest in the optical tap area. The triangle hypotenuse 1840 can be made reflective using metallization or other techniques. Accordingly, incoming beams will enter the prism through a face that has anti-reflective coating and be reflected out of the optical tap using the reflective hypotenuse.

While the method described above is effective for area splitters such as the right angle splitters, a similar sawing or photo-etching process can be used to create locations for dove prisms. The waveguide creation and metallization processes used for incorporating the dove prisms into the waveguides are similar. However, the slots sawed into the waveguide for the dove prisms can each have the same depth and then the dove prisms can be inserted into the slots of the waveguide. The dove prisms are configured to transmit some of the optical signal or light and so the dove prisms can be inserted directly into the waveguide where desired.

An alternative embodiment can use dove prisms as area splitters. This can be done by varying the sizes of the dove splitters in a way similar to what has been illustrated for the triangular prisms. In this way, the dove splitters can be configured to allow a selected amount of light to pass over the dove prisms and arrive at another dove splitter.

Large core hollow waveguides can be used to interconnect electronic devices located on one or more circuit boards or silicon wafers. The electronic devices may have electrical outputs and inputs that are converted to optical output for transmission through the optical waveguides. Alternatively, the electronic devices may be optical devices that transmit and receive optical signals without a need for conversion. The large core hollow waveguide with a reflective coating on an interior of the waveguide can substantially reduce losses of the optical signal guided through the waveguide as compared to solid core waveguides. The reflective coating on the interior of the hollow waveguide can minimize loss caused by reflections of the optical signal within the waveguide. Prism splitters can be used in the waveguides to correct for walk-off and allow a beam transmitted through the prism to be returned to the same waveguide at the same angle at which the beam was received. In addition, a reflective coating can be provided on prisms to direct a portion of the optical signal based on the area occupied by the prism within the waveguide.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The invention claimed is:

1. An optical splitter device, comprising:
   a waveguide, having walls forming a large hollow core, configured to direct an optical signal through the large hollow core;
   an optical tap formed through one wall of the waveguide;
   a plurality of area based prisms in the large hollow core of the waveguide and aligned with the optical tap, the plurality of area based prisms being of increasing size as the distance from an optical signal source increases, wherein each of the plurality of area based prisms is mounted in the optical tap using a support formed from a waveguide cover; and
   a splitter coating on each of the plurality of area based prisms to direct a portion of the optical signal outside of the waveguide through the respective optical tap.

2. An optical splitter device as in claim 1, wherein at least one of the plurality of area based prisms is a dove prism or an inverted dove prism being configured to redirect optical signals transmitted through the prism with walk-off back into the waveguide.

3. An optical splitter device as in claim 2, wherein the dove prism has a splitter coating on a receiving face and an anti-reflective coating on an outgoing face and total internal reflection for a base of the dove prism.

4. An optical splitter device as in claim 2, wherein the inverted dove prism has a splitter coating on an inverted base of the inverted dove prism, and an anti-reflective coating on an incoming face and outgoing face of the inverted dove prism.

5. An optical splitter device as in claim 1, wherein at least one of the plurality of area based prisms located in the waveguide is a triangular prism.

6. An optical splitter device as in claim 5, wherein the triangular prism has a reflective metalized coating applied to the hypotenuse of the triangular prism and the triangular prism is configured to redirect optical signals transmitted through the prism with walk-off back into the waveguide.

7. An optical splitter device as in claim 1, wherein the plurality of area based prisms further comprises a plurality of right angle prisms having a reflective metalized coating applied to a hypotenuse and the right angle prisms are used as area based splitters in the waveguide.

8. An optical splitter device as in claim 1, wherein the plurality of prisms are formed for a wall of a waveguide using a process selected from the group consisting of injection molding, embossing, and stamping.

9. A method for manufacturing an optical splitter device for a waveguide having a large hollow core, comprising
   forming a hollow channel in a silicon substrate;
   depositing metal on the hollow channel to make the hollow channel reflective and create a waveguide;
   sawing depth slots across the waveguide, wherein each of the depth slots has a decreasing depth as the depth slot distance increases from an optical signal source;
   inserting right angle prisms, having a metalized coating on a hypotenuse, into the depth slots and the right angle prisms are oriented with a hypotenuse toward incoming optical signals; and
   applying a cover over the hollow channel.

10. A method as in claim 9, wherein forming a hollow channel includes sawing the hollow channel into the silicon substrate using a dicing saw.

11. A method as in claim 9, further comprising the step of bonding a second silicon wafer to a bottom of the first silicon wafer.

12. A method as in claim 9, wherein the step of patterning the silicon substrate further comprises the steps of applying photoresist, applying a photolithography process, applying a dry etching process, and using a cleaning process.

13. A method for manufacturing an optical splitter device for a waveguide having a large hollow core, comprising
   forming a hollow channel in a silicon substrate;
   depositing metal on the hollow channel to make the hollow channel reflective and create a waveguide;
   sawing depth slots across the waveguide, wherein each depth slot has the same depth;
   inserting dove prisms into the depth slots; and
   applying covers over the hollow channel.

14. An optical splitter device, comprising
   a waveguide, having walls forming a large hollow core, configured to direct an optical signal through the large hollow core;

an optical tap formed through one wall of the waveguide;

a prism in the large hollow core of the waveguide and aligned with the optical tap, wherein the prism is a dove prism or an inverted dove prism being configured to redirect optical signals transmitted through the prism with walk-off back into the waveguide; and a splitter coating on the prism to direct a portion of the optical signal outside of the waveguide through the optical tap.

15. An optical splitter device as in claim 14, wherein the dove prism has a splitter coating on a receiving face and an anti-reflective coating on an outgoing face and total internal reflection for a base of the dove prism.

16. An optical splitter device as in claim 14, wherein the inverted dove prism has a splitter coating on an inverted base of the inverted dove prism, and an anti-reflective coating on an incoming face and outgoing face of the inverted dove prism.

17. An optical splitter device as in claim 14, further comprising a plurality of area based prisms of increasing size as the distance from an optical signal source increases.

* * * * *